(No Model.) 2 Sheets—Sheet 1.
H. B. WILLIAMS.
CAR TRUCK.
No. 496,145. Patented Apr. 25, 1893.
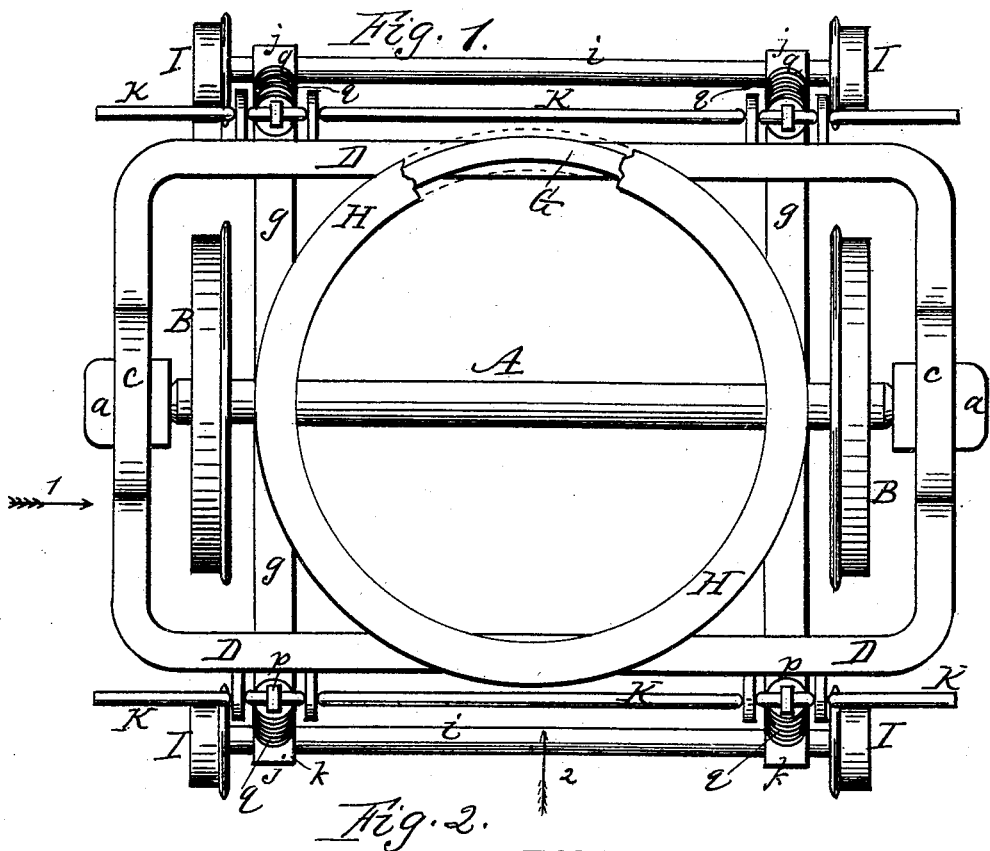
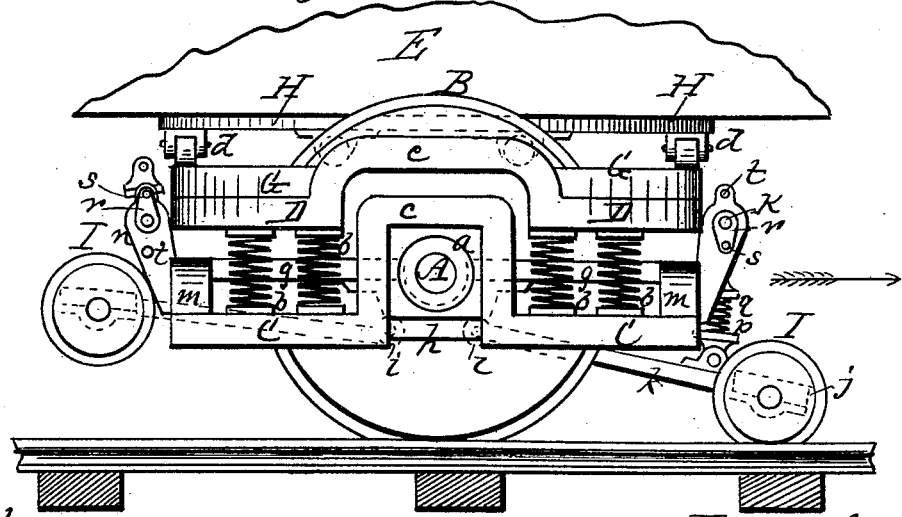
Witnesses.
Inventor.
Henry B. Williams,
pr R. S. Osgood,
atty (No Model.) 2 Sheets—Sheet 2.

H. B. WILLIAMS.
CAR TRUCK.

No. 496,145. Patented Apr. 25, 1893.

Witnesses.
P. H. Costich
Chas. H. Widener

Inventor.
Henry B. Williams,
per R. F. Osgood,
atty.

UNITED STATES PATENT OFFICE.

HENRY B. WILLIAMS, OF ROCHESTER, NEW YORK, ASSIGNOR OF ONE-HALF TO LEMUEL A. JEFFREYS, OF SAME PLACE.

CAR-TRUCK.

SPECIFICATION forming part of Letters Patent No. 496,145, dated April 25, 1893.

Application filed April 13, 1892. Serial No. 428,995. (No model.)

*To all whom it may concern:*

Be it known that I, HENRY B. WILLIAMS, of Rochester, in the county of Monroe and State of New York, have invented a certain new and useful Improvement in Car-Trucks; and I do hereby declare that the following is a full, clear, and exact description of the same, reference being had to the drawings accompanying this specification.

My improvement relates to radial trucks with devices to facilitate the turning of curves.

It also relates to that class where pilot wheels stand in advance of the main wheels for guiding the latter on the curve.

The device is specially adapted to street cars, but may also be used on other cars.

The invention consists in the construction and arrangement of parts hereinafter described and claimed.

Figure 3:
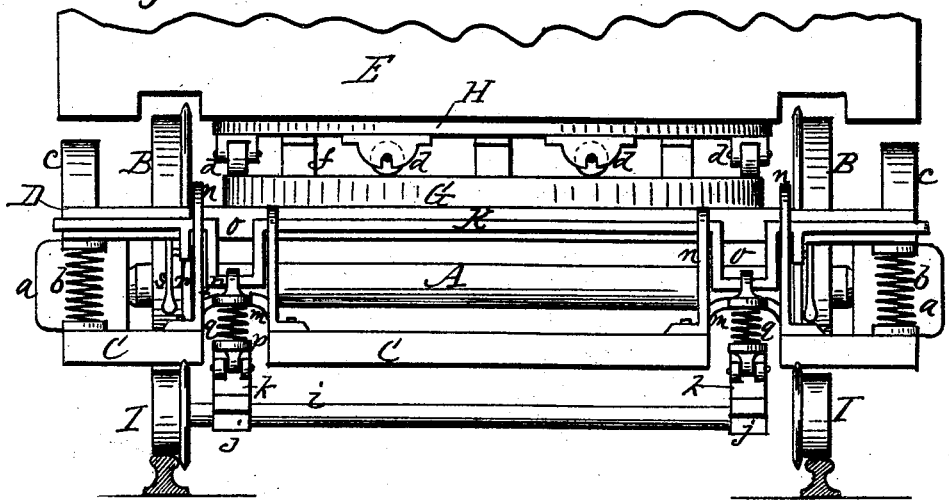
Figure 4:
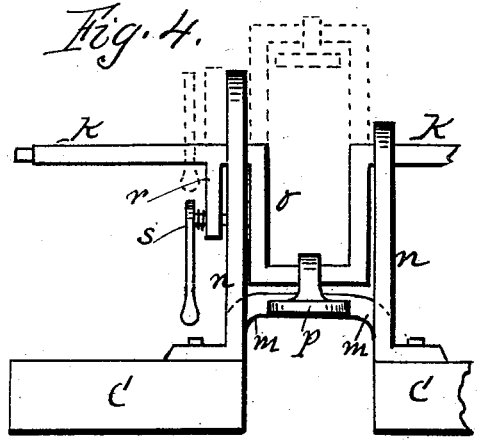
Figure 6:
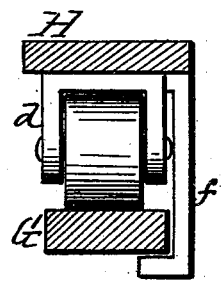
Figure 5:
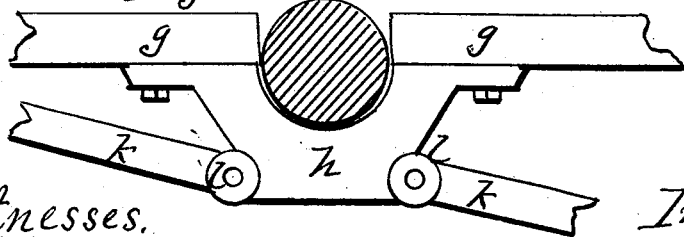

In the drawings—Figure 1 is a plan view of the truck. Fig. 2 is a side elevation looking in the direction indicated by arrow 1 in Fig. 1. Fig. 3 is a front elevation looking in the direction indicated by arrow 2 in Fig. 1. Fig. 4 is an enlarged front elevation of one of the cranks and its connections for operating the guide wheels in advance of the main wheels of the truck. Fig. 5 is an elevation of the connection between the tie beams of the truck and a cross section of the car axle. Fig. 6 is an enlarged cross section of the two rings at the top of the truck that support the car body, showing also one of the friction rollers and one of the guides for holding the rings in place.

This invention is designed more particularly for cable or electric cars where it is necessary to provide room for the attachment of the cable-grip or motor, and where it is also desirable to locate the car body low down.

One of the leading features of the invention is the use of two frames—one resting on and supported by the axle, and therefore non-elastic, and the other supported by the first, resting on springs, and sustaining the rings that hold the car body.

Another important feature is a set of cranks and connecting devices for raising and lowering the guiding wheels of the truck.

In the drawings A indicates the axle and B B the main wheels of the truck. These may be either single, as shown in the drawings, or double as used in many trucks.

C and D are the two frames above referred to, the same usually being of rectangular form. The lower frame C is supported by boxes $a\ a$ which rest on the ends of the axle as usual. This frame is therefore stationary and non-elastic and rides with the axle. The upper frame D is supported by spiral or other springs $b\ b$ which rest on the lower frame on each side of the axle. Any desired number of springs may be used, the drawings showing two in front and two in the rear. The upper frame supports the car body E. In order to locate the car body low down the two frames C D are bent or cranked as shown at $c\ c$, Fig. 2. The bent portion of the lower frame embraces the box $a$, while that of the upper frame simply plays up and down over that of the lower frame, sufficient space being left between them for the purpose.

G and H are two rings forming the circle plates. The lower ring G is permanently attached to the upper frame D, while the upper one H is attached to the bottom of the car body E. To the under side of ring H is attached a set of friction rollers $d\ d$ which rest and travel on top of the lower ring, thus obviating undue friction. Ball bearings might be used between the rings. The upper ring is also provided at intervals with hook-shaped guides or stays $f\ f$ (Fig. 6) which extend down inside the lower ring and embrace the same as shown, thereby keeping the parts in place. By the use of these rings the ordinary king bolt or pin is dispensed with and space is left between the axle and the ring for the location and attachment of the grip in cable cars, or the motor in electric cars. At the same time the rings allow free turning movement of the truck under the car to pass curves. The lower frame is provided with stiff bars $g\ g$ one on each side, which extend longitudinally and serve as the attachment for the grip or motor, so that said grip or motor shall ride permanently with the stationary part of the truck and have no vibrating motion. These bars come on line with the axle, and in order to pass the axle they are cut away at that point and are united by a bracket $h$ (Fig. 5), bolted on the under side and hollowed to receive the axle. The arms which support the guide wheels are also pivoted to these brackets, as will presently be described.

I I are the guide wheels, of which one pair is attached at each end of the truck to the permanent portion of the truck. These guide wheels run on the track in advance of the main wheels and serve to guide the main wheels on the curve without undue friction or grinding. Each pair of the guide wheels is connected by an axle $i$, and the latter rests in boxes $j\,j$ attached to arms $k\,k$ which latter are pivoted at $l\,l$ to the brackets $h\,h$. By this means the guide wheels can be raised from the track when not in use, as indicated at the left in Fig. 2. To enable them to be raised without having the arms $k\,k$ strike the lower frame, the latter is cut away at that point and the ends connected by an iron arch $m$, as shown most clearly in Fig. 4.

K is a crank shaft resting in suitable bearings $n\,n$, and located above the guide wheels I I. This crank shaft is provided with cranks $o\,o$, (Figs. 3 and 4,) above the arms $k\,k$. Each crank and each arm are provided with a pivoted head $p$, and between these heads rests a coiled or other spring $q$. When the cranks are turned down as shown in full lines Fig. 4 the springs are compressed forcibly down on the arms, holding the guide wheels to the track with an elastic pressure, and when thrown up the wheels are drawn up with them and stand elevated above the track. It is designed that the guide wheels standing in front when the car is in motion shall be in contact with the track, and those in the rear shall be raised. The crank shaft enables this change to be readily made at each change of direction. The crank shaft K is easily turned at either end by fitting a removable handle thereto and turning the same by hand.

The crank shaft K is provided with two projecting arms $r\,r$, (Fig. 4), which rest near to the outer bearings $n\,n$ and these arms are provided with spring pins $s$, or equivalent devices, which press inward and engage with holes $t\,t$ in the bearings. These holes are located equi-distant above and below the axis of the crank shaft, so that as the pins strike therein they hold the cranks either elevated or depressed, as the case may be. These spring pins may be operated by hand or by suitable automatic means.

Having described my invention I do not claim broadly a car truck composed of two frames with interposed springs. Neither do I claim broadly a circle plate between the car body and truck.

What I claim as new, and desire to secure by Letters Patent, is—

1. In a car truck, the combination of the two independent frames C and D arranged one above the other, cranked at the center to bring them low down, the upper crank embracing the lower one, the box $a$ resting in the lower crank, and springs $b\,b$ interposed between the frames outside the cranked portions, as shown and described and for the purpose specified.

2. In a car truck, the combination of the two independent frames C D cranked in the center as described, the box $a$ resting in the lower cranked portion, the springs $b\,b$ interposed between the frames, the circle plate G attached to the upper frame, and the circle plate H attached to the car and provided with friction rollers $d\,d$ resting on the plate G, as shown and described and for the purpose specified.

3. The combination, with the guide wheels attached to arms pivoted to the truck, of a crank shaft provided with cranks located above the wheels, heads pivoted respectively to the cranks and arms, and springs located between the heads, whereby elastic pressure can be given to the guide wheels, as herein shown and described.

4. The combination, with the guide wheels attached to arms pivoted to the truck, of a crank shaft provided with cranks, connections between the cranks and the arms carrying the guide wheels, arms on the crank shaft, and spring pins connected with said arms for locking the cranks in opposite positions, as shown and described and for the purpose specified.

In witness whereof I have hereunto signed my name in the presence of two subscribing witnesses.

HENRY B. WILLIAMS.

Witnesses:
R. F. OSGOOD,
P. H. COSTICH.